(No Model.)
B. S. WILDER.
COTTON CHOPPER.
No. 246,582. Patented Aug. 30, 1881.
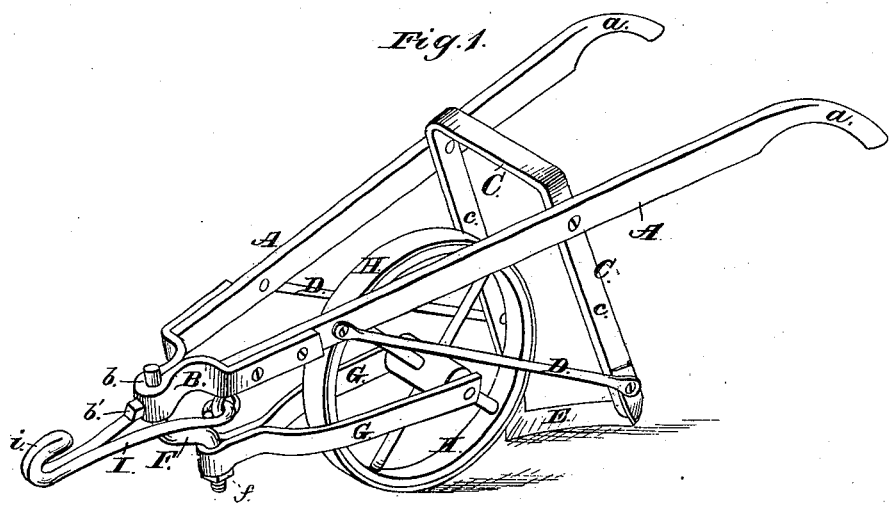
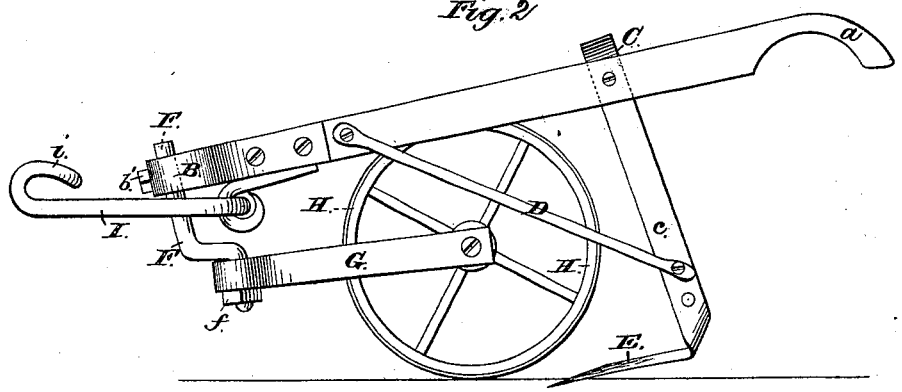
Witnesses:
Jas. E. Hutchinson
Henry C. Hazard
Inventor:
B. S. Wilder, by
Geo. S. Prindle, his Atty

UNITED STATES PATENT OFFICE.

BERT S. WILDER, OF DEXTER, TEXAS.

COTTON-CHOPPER.

SPECIFICATION forming part of Letters Patent No. 246,582, dated August 30, 1881.

Application filed June 4, 1881. (No model.)

*To all whom it may concern:*

Be it known that I, B. S. WILDER, of Dexter, in the county of Cook, and in the State of Texas, have invented certain new and useful Improvements in Cotton-Choppers; and I do hereby declare that the following is a full, clear, and exact description thereof, reference being had to the accompanying drawings, making a part of this specification, in which—

Figure 1 is a perspective view of my improved implement, and Fig. 2 is a side elevation of the same.

Letters of like name and kind refer to like parts in each of the figures.

The design of my invention is to enable such cotton-plants to be removed from the rows as may be necessary, in order that the remainder may thrive; and to this end it consists, principally, in a cotton-chopper provided with a rolling support that is swiveled to the front end of the frame and trails behind such swiveled connection immediately in front of the cutting-blades, substantially as and for the purpose hereinafter specified.

It consists, further, in the construction and combination of the various parts of the machine, whereby the same is enabled to operate across the rows of cotton-plants, substantially as and for the purpose hereinafter shown.

In the annexed drawings, A and A represent two wooden side bars, which at their front ends are connected together by means of an iron strap, B, and from thence extend rearward and apart and terminate in handles a, that are similar to the handles of a plow. Near their rear ends the bars A are secured in relative positions by means of a bar, C, which has the general form of two sides and one end of a rectangle, and at its sides, near its upper end, is secured upon the inner faces of said bars, and extends from thence downward in a line at or near a right angle to the line of the latter.

From a point near the lower end of each leg c of the bar C, a brace-rod, D, extends forward and upward, and has its opposite end attached to or upon the outer face of the contiguous side bar, near the front end of the latter, while to the lower ends of said legs is attached a cutter, E, which extends horizontally forward and has a V shape in plan view.

Within the front end of the strap B is formed an eye, b, that has a vertical opening which receives and contains one end of a round bar, F. Said bar is secured in place within said eye by means of a set-screw, b', which passes horizontally inward through the front wall of said eye b, and at its inner end impinges upon said bar. From a point below the eye b the bar F extends for a short distance horizontally rearward, and thence downward, and upon its rear vertical portion is swiveled a metal frame, G, that has a general V shape, its point being thus connected with said bar. The lower end of said bar is threaded and provided with a nut, f, which insures the vertical position of said frame and leaves it free to move horizontally upon its said bearing.

Within the rear forked portion of the frame G is journaled a ground-wheel, H, which may have any desired dimensions, but has preferably a diameter substantially equal to the distance between the side bars, A, and the cutter E. The length of the frame G is such as to bring the wheel immediately in front of the point of the cutter E and its vertical adjustment, such as to cause the lowest point of its periphery to be but slightly above said cutter.

A bar, I, pivoted upon the lower side at the front end of the side bars, A, and provided at its front end with a hook, i, for connection with a single or double tree, completes the device, the operation of which is as follows, viz: A cutter having the necessary width to cut out the spaces determined upon, (the width of said spaces being governed by the number and vigor of growth of the cotton-plants,) is first adjusted to the machine, and the latter, drawn by one horse, is then moved across the rows of plants in a line having a right angle to said rows. The bearing-wheel causes the machine to mount and pass over each row, while the cutter, following in its immediate rear and at a point slightly below, passes through the soil at the top of the row and neatly and easily cuts off the plants to a distance equal to its full width without disturbing the plants upon each side. In consequence of the position of the bearing-wheel immediately in front of the cutter, the latter rises and falls with the former, and is enabled to effectively operate upon each row as it passes over, while if said wheel were placed at a materially greater distance in front of said cutter it would have commenced descending one side of a row before the latter had entered the opposite side, by which means said cutter would be compelled to cut forward and downward upon the line traveled by said wheel, the result being such a depth of cut as to be wholly impracticable. The swiveling of the bearing-wheel enables the course of the machine to be directed with ease and certainty and materially enhances its practicability and usefulness.

Having thus fully set forth the nature and merits of my invention, what I claim as new, is—

1. A cotton-chopper having the horizontal cutter E, and provided with a rolling support that is swiveled to the front end of the frame and trails behind such swiveled connection immediately in front of the cutting-blades, substantially as and for the purpose specified.

2. The combination of the wheel H, journaled in the swiveled frame G, with the chopper-knife E, adjustably mounted in the angular frame C, whereby the cutting-depth of said chopper is gaged, substantially as and for the purpose shown.

In testimony that I claim the foregoing I have hereunto set my hand this 30th day of May, 1881.

BERT S. WILDER.

Witnesses:
W. W. FOSTER,
JNO. F. MORRIS.